UNITED STATES PATENT OFFICE.

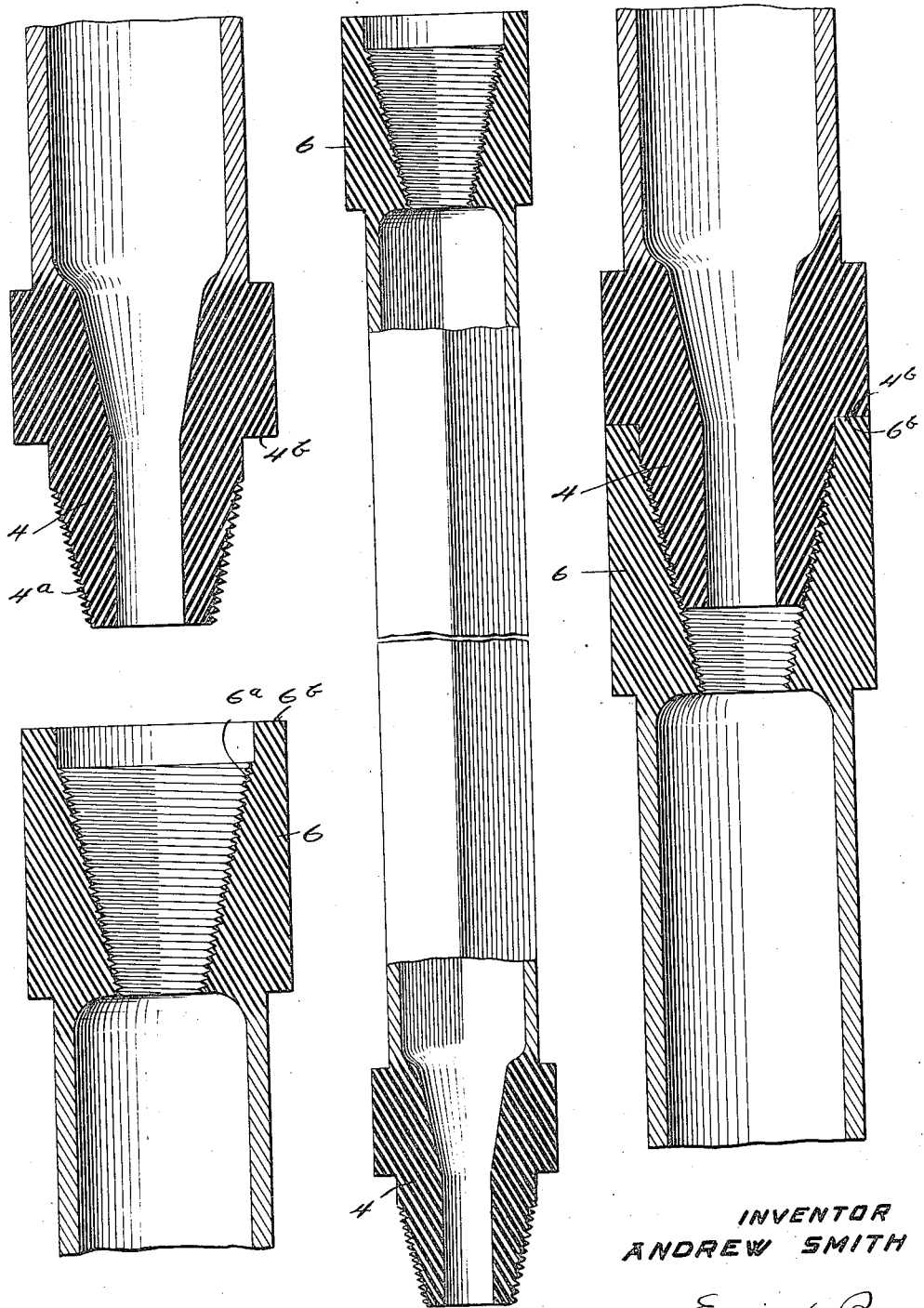

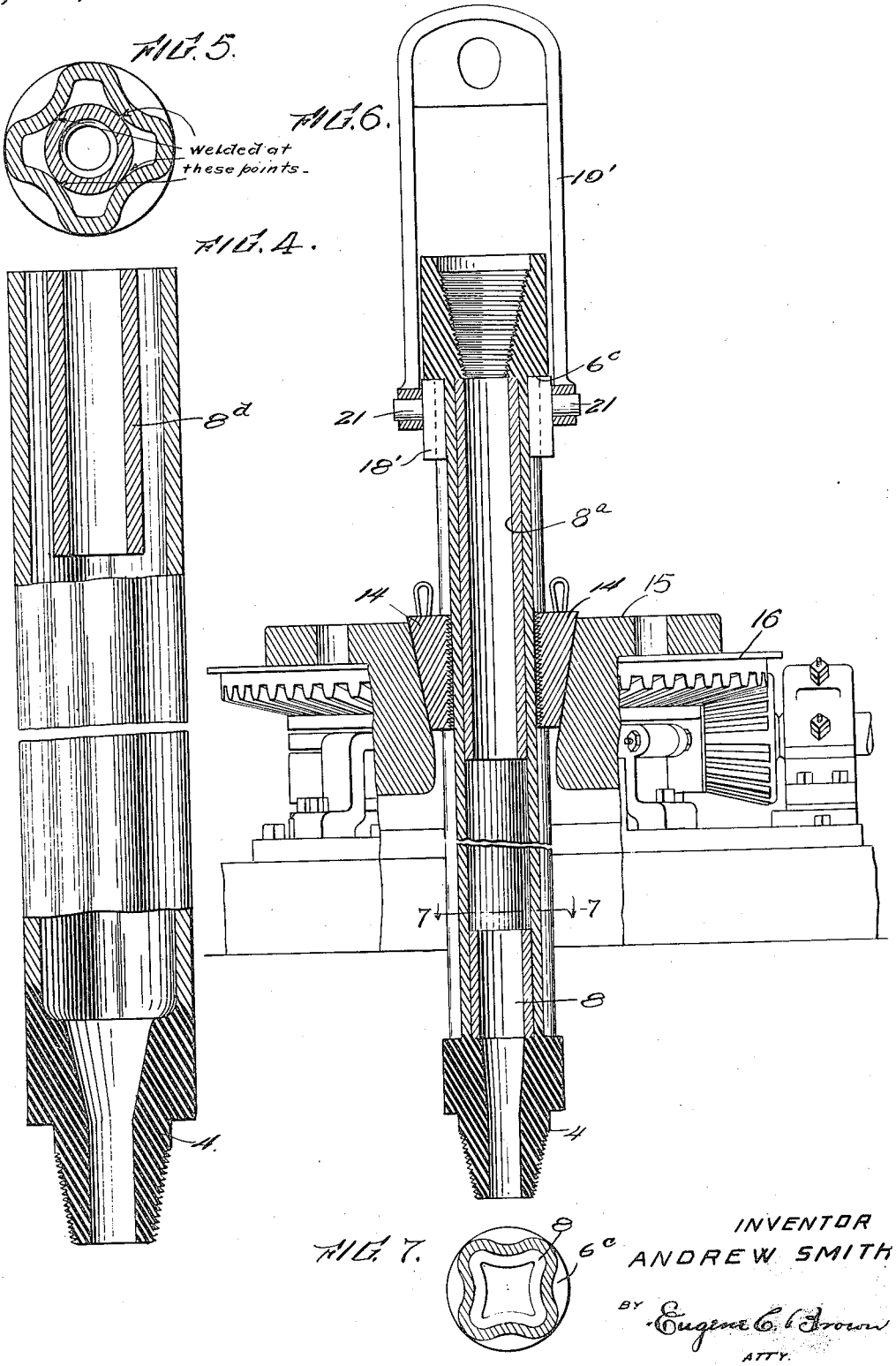

ANDREW SMITH, OF SAN MATEO, CALIFORNIA, ASSIGNOR TO SMITH METAL PERFORATING COMPANY, OF SAN MATEO, CALIFORNIA.

ROTARY-DRILL PIPE AND CONNECTING MEANS THEREFOR.

1,320,503. Specification of Letters Patent. Patented Nov. 4, 1919.

Application filed February 5, 1916. Serial No. 76,365.

*To all whom it may concern:*

Be it known that I, ANDREW SMITH, a citizen of the United States, residing at San Mateo, in the county of San Mateo and State of California, have invented certain new and useful Improvements in Rotary-Drill Pipes and Connecting Means Therefor, of which the following is a specification.

This invention relates to the construction of drill stems and connecting means for uniting the several sections or units thereof which are employed in drilling wells for oil, gas, and water and are especially adapted for use with rotary drilling rigs.

In the operation of drilling wells with a rotary equipment it is the common practice to attach the cutter or drill bit by a threaded or other connection to the lower end of a drill stem consisting of connected sections of pipe, the top section or driving-stem section being engaged by the rotary table which imparts the rotary motion. The driving-stem sections in use are sometimes circular in cross-section, although they have also been made of special shapes which may be more readily held by the driving means of the rotary table. This driving section is from twenty to fifty feet in length so that the drill stem or pipe which depends from its lower end may be lowered nearly that distance as it is rotated in forcing the drill downward. When the drilling has proceeded until the driving section has moved down until its upper end is nearly level with the upper surface of the turn table, it is necessary to stop the rotation of the table, lift the entire length of stem sufficiently to disconnect the driving section, insert a new length of pipe or unit and then re-attach the driving section in order to proceed with the drilling operation.

At the upper end of the drill stem there is connected a hydraulic swivel attached to a hose through which water is constantly forced down the hollow stem, and passing outwardly at the bottom through vents adjacent the drill bit to wash away the drillings or detritus and carry them upwardly between the outside of the drill stem and the wall of the bore to the surface of the well.

It is customary to unite the ends of the sections or units of the drill pipe or stem with union members or collars that are provided with fine cut threads slightly flaring to correspond with the tapered threads cut in the ends of the pipe and when these connecting threads become very tightly screwed together during the drilling operation they become so tightly wedged together as to be galled or "frozen" and it becomes practically impossible to unscrew the parts without destroying the threads. This galling or freezing of the threads uniting the pipe sections and the collars is caused partly by the wedging effect due to the slight taper and partly by reason of the fact that the metal of the pipe is not of sufficient hardness to withstand the strains to which the fine cut threads are subjected, especially when they must undergo frequent screwing and unscrewing during the drilling operation. In addition to the objections above mentioned, it has been found in practice that pipe sections which are threaded into couplings do not properly aline when screwed together, and this results in the formation of bends at the joints which are thereby subjected to increased strains during the drilling operations frequently causing a breakage at those points. One of the purposes of my invention is to eliminate the use of couplings of this type in which the drill pipe or stem sections are threaded into the connecting fittings.

During the drilling of a well it is very often necessary to lift the entire length of drill stem out of the well for the purpose of replacing a dull bit with a sharp one and for various other reasons familiar to engineers. In this case the sections or units are sometimes unscrewed successively one by one as they emerge from the well, but it is usual to suspend the pipe from a high derrick erected over the well, and disconnect in about eighty foot lengths. To facilitate the ready removal of such lengths, it has been customary to insert a special two-part coupling at every third or fourth joint and spaced, therefore, about eighty feet apart, in which the opposite pin and socket portions are corresepondingly tapered and provided with heavy coarse threads. While the coarse threads of these tapered coupling members facilitate the operation of connecting and disconnecting the sections of a drill stem, greatly reducing the time and labor required and minimized the wear of the interlocking parts, yet the joints were weak and inadequate to sustain the enormous weight and strains imposed because it was still necessary to use fine cut threads on the ends of the pipe sections in securing the pin and socket portions thereon. Moreover, in order to have the walls of the coupling of adequate thickness for strength, it was necessary to make the parts of such a diameter that they projected considerably beyond the outside wall of the drill stem. The projections thus formed are objectionable because they form shoulders or abutments which rub against or drag upon the wall of the well, thereby breaking off soil along the sides of the well, causing it to cave in and also forming a lodging place for such falling material which interferes with the removal of the stem when this becomes necessary.

One of the main purposes of my invention is to eliminate the use of fine threaded coupling members, and the necessity for threading the ends of the pipe sections and to unite the sections by means of strong coarse threads which are interlocked throughout their length by a minimum of turns or revolutions and may be constructed of harder material than the body of the pipe sections.

In the accompanying drawings, Figures 1 and 2 are fragmentary longitudinal sections of a coupling member attached to the ends of adjacent drill stem sections and embodying my invention, the pin and socket portions of the coupling being disconnected and separated in Fig. 1, and connected in Fig. 2; Fig. 3 is a side elevation, with the ends in section, of a square drilling stem suitable for use in rotary machines and called the "grief pipe," embodying my invention and having the pin and socket portions of the coupling member or box connected to opposite ends respectively; Fig. 4 is a side elevation partly in section of a modification of my invention; Fig. 5 is a cross sectional view of the same; Fig. 6 is a side elevation, partly in section, of a rotary drilling machine of the type used in the oil fields of California and showing in longitudinal section a further modification of my drill stem; and Fig. 7 is a cross-section on the line 7—7 of Fig. 6.

Referring to Figs. 1, 2 and 3, the opposite ends of each section of my drill stem are provided respectively with coupling members comprising a pin portion 4, and a socket portion 6, which are correspondingly tapered and provided with strong coarse threads $4^a$, $6^a$. The taper is such that the pin may be inserted nearly its full length before engagement with the socket and then a few turns or revolutions will completely interlock the threads and will also seat the pin shoulder $4^b$ against the end wall $6^b$ of the socket, thereby preventing the wedging action upon the threaded parts which would otherwise occur. As appears from Fig. 2, the pin is preferably shorter than the socket so that any wear may be compensated by cutting the shoulder $4^b$ back and permitting the pin to enter slightly more into the socket.

In order to effectively resist the strains to which the threads are subjected by the weight of the stem and due to the torsional stresses of the drilling operation, I prefer to construct the end coupling elements of harder material than the body of the pipe or stem and then weld unite it to the latter in any suitable manner but preferably by one of the electric welding processes. In some cases I find it also desirable to make the pin and socket members of different degrees of hardness, there being less wear upon the threads when one part is harder than the other. By my method of forming the units or sections I am enabled to make the pin and socket portions of the coupling members separately and of metal of any desired hardness and then weld unite them to the ends of the stem or pipe sections. The parts may be welded by any suitable welding process, preferably by one of the electric welding processes, the manner of preparing the adjacent parts depending somewhat upon the particular method of welding employed. I have indicated by the merging of the light and heavy cross-hatching at the ends, that the metal of the pipe and of the pin member have been united. When the parts have been thus welded together, each unit or section of the stem is complete in itself, the coupling elements forming an integral part thereof, the union between the body of the pipe or stem and the end coupling elements being at least as strong as any other part. The units or sections may, therefore, be coupled together one after the other without the necessity for any separate unions and can be readily connected and disconnected as often as required without endangering the integrity of the coarse threads.

The main body of the stem may be a plain cylindrical pipe, or corrugated, the corrugations not only increasing the strength of the pipe against crushing strains but also increasing the lateral flexibility, thereby permitting a certain amount of bending which enables the pipe to follow a bore that deviates from a straight course and relieves the joints of the strains to which they would otherwise be subjected.

I prefer to reinforce the stem at the lower end adjacent the pin member as indicated at 8 in Figs. 6 and 7, where the stem is grasped by the tongs in connecting or disconnecting the sections and also adjacent the upper ends as shown at $8^a$, where the stem is grasped by the slips 14 held in the spider 15, of the rotary table 16, to support the drill stem prior to being lifted from the well.

It will be observed that the exterior diameter of the end coupling elements do not extend beyond the periphery of the main body of the pipe so that there are no projections extending beyond the outer wall of the pipe, and consequently there are no abutments to rub against and cut into the wall of the well or upon which caving material may lodge.

Circular stems are objectionable because of the difficulty of obtaining a grip in the driving mechanism of the rotary turn table. I have therefore devised suitable shapes for the drive stem section which can be easily manufactured and may be firmly held by the driving means. In Fig. 3, I have shown a square or rectangular stem and in Figs. 4 to 7, I have shown various fluted shapes, the grooves, recesses or corrugations extending longitudinally and terminating adjacent the end pin and socket coupling elements, the latter projecting over the grooves and forming shoulders 6ᶜ against which the elevators of the hoisting apparatus may engage, as illustrated in Fig. 6. The elevators may have bearing blocks 18′ properly shaped to fit into the grooves in the stem and carrying pivot pins or trunnions 21 for the bail 19′. It will be apparent that the rotary table may be easily supplied with driving members conforming to the shape of any of these stems and that their angular shapes will prevent any rotary slipping while allowing the stem to feed longitudinally as the drilling progresses.

The shape or configuration of the drive stem section may be formed by rolling or by means of dies while the metal is in the sheet, or by reshaping cylindrical tubes. In some cases it may be desirable to shape the stem from a solid billet and then bore a hole longitudinally therethrough.

In Figs. 4 and 5, I have shown the reinforcement 8ᵈ of circular section having its outer perimeter engaging the inner wall of the grooved portions of the stem.

While I have described in detail the constructions illustrated in the accompanying drawings for the purpose of clearly disclosing my invention, it will be apparent to engineers that various changes and modifications can be made within the scope of my claims and without departing from the spirit of my invention.

The many advantages which accrue from the improvements above described will be appreciated especially by those who have had experience in operating well drilling machinery. I have eliminated the necessity for auxiliary union members or fittings and have overcome the inherent defects in attached coupling members due to the use of too many and too fine threads which were required when the ends of the pipe were threaded. My method of first forming the coarse taper threaded coupling elements and then weld uniting them to the tube or stem body not only eliminates the weakness due to the fine cut threads heretofore employed but enables me to form the coupling elements of metal having a different hardness from the pipe, and if desired each element of a different degree of hardness, which diminishes the wear upon the threads. Moreover the weld union between the parts is at least as strong as any other part while the reinforcement of the parts that are gripped by the tongs and by the rotary machine insures the integrity of the stem under all circumstances and greatly increases its life. Furthermore, as above pointed out, my manner of constructing the units or sections of the stem overcomes the difficulties heretofore encountered by reason of the projections or abutments at the couplings, and the faulty alinement causing crooked drill stems.

I claim:—

1. A drill stem unit or section, comprising a tubular metal casing having a weld-united coupling element at each end, one element having a coarsely threaded, tapering pin and the other element having a correspondingly flaring, coarsely threaded bore forming a socket, the casing adjacent the socket element having a reinforcement welded to said element.

2. A drill stem unit or section, comprising a tubular metal casing having a weld-united coupling element at each end, one element having a coarsely threaded, tapering pin and the other element having a correspondingly flaring, coarsely threaded bore forming a socket, the outer wall of said casing being substantially flush with the periphery of said elements at certain points and within said periphery between said points, whereby the periphery of said elements overhangs the walls of the casing at certain portions forming shoulders adapted to receive hoisting mechanism by which the drill stem may be lifted from a well.

3. A drill stem unit or section, comprising a tubular metal casing having integral metal coupling elements at each end one of said elements being of harder material than the other.

4. A drill stem unit or section, comprising a tubular metal casing having integral coupling elements at each end, said elements having a substantially circular perimeter and said casing having a different sectional outline flush therewith at certain points and within the perimeter at the other points.

5. A drill stem unit or section, comprising a tubular metal casing having integral coupling elements at each end, said elements having a substantially circular perimeter and said casing having a different sectional outline within said perimeter but flush therewith at certain points whereby said elements will overhang certain portions of the wall of said casing thereby forming shoulders adapted to receive hoisting devices by which the drill stem may be lifted from a well.

6. A section of a well-boring tube or pipe having at opposite ends mating coupling members integrally united with the walls of the tube and the exterior perimeter of the two being substantially flush with the periphery of the coupling members at certain points and within the periphery at the other points thereof, said coupling members comprising respectively a tapered externally coarsely screw-threaded pin, and a correspondingly internally conically flared and coarsely-threaded socket, so that the pipe sections may be readily connected to form a continuous stem of any desired length and having an unobstructed exterior surface, by screwing the pin member of one section into the socket member of the preceding section, and so that the sections may be readily disconnected as the stem is withdrawn from a well.

7. A drill stem unit or section, comprising a tubular metal casing having mating coupling elements at opposite ends, one element comprising a coarsely threaded tapering pin and the other element comprising a correspondingly flaring coarsely threaded socket, said coupling elements being formed of harder material than the casing and being welded thereto to thereby form the casing and coupling elements into an integral structure.

In testimony whereof I affix my signature in presence of two witnesses.

ANDREW SMITH.

Witnesses:
 ROSE M. HALLORAN,
 BESSIE E. MUNRO.